United States Patent
Ammer et al.

(10) Patent No.: US 6,398,261 B1
(45) Date of Patent: Jun. 4, 2002

(54) VEHICLE FRAME SIDERAILS WITH STANDARDIZED POSITIONING OF ATTACHMENT SUPPORT HOLES

(75) Inventors: John M. Ammer, New Haven; Matthew D. Friede; Dennis J. Ulman, both of Fort Wayne, all of IN (US)

(73) Assignee: International Truck and Engine Corp., Warrenville, IL (US)

( * ) Notice: Subject to any disclaimer, the term of this patent is extended or adjusted under 35 U.S.C. 154(b) by 0 days.

(21) Appl. No.: 09/579,907

(22) Filed: May 26, 2000

Related U.S. Application Data

(60) Provisional application No. 60/136,081, filed on May 26, 1999.

(51) Int. Cl.[7] .............................................. B62D 21/00
(52) U.S. Cl. ...................................... 280/781; 296/204
(58) Field of Search ................................. 280/781, 785, 280/786, 789, 797, 799, 800; 296/204

(56) References Cited

U.S. PATENT DOCUMENTS

| | | | | |
|---|---|---|---|---|
| 2,165,074 A | * | 7/1939 | Sherman | 280/794 |
| 4,386,792 A | * | 6/1983 | Moore et al. | 280/781 |
| 5,364,128 A | * | 11/1994 | Ide | 280/784 |
| 5,725,247 A | * | 3/1998 | Nilsson et al. | 280/781 |
| 6,047,989 A | * | 4/2000 | Wood | 280/789 |

* cited by examiner

Primary Examiner—Paul N. Dickson
Assistant Examiner—Faye M. Fleming
(74) Attorney, Agent, or Firm—Jeffrey P. Calfa; Dennis Kelly Sullivan; Neil T. Powell

(57) ABSTRACT

The invention relates to a motor vehicle frame. The frame is constructed from two parallel siderails running longitudinally down the length of the vehicle. An intermediate cross member support is positioned between the siderails to support a driver's cab. A datum support hole is positioned through each siderail to support mounting of one end of the cross member support for the driver's cab. The remaining support holes are arrayed in rows and columns positioned with reference to the datum support hole. A first row of supplemental support holes runs parallel to a bottom flange on each siderail and includes the datum support hole. A second row of supplemental support holes in each siderail runs parallel to and above the first row. A third row of supplemental support holes in each siderail runs parallel to the first and second rows and is positioned above the second row by the distance as the second row is above the first row.

8 Claims, 4 Drawing Sheets

200
VEHICLE FRAME SIDERAILS WITH STANDARDIZED POSITIONING OF ATTACHMENT SUPPORT HOLES

REFERENCE TO RELATED APPLICATIONS

This patent is related to provisional application Serial No. 60/136,081 filed May 26, 1999.

BACKGROUND OF THE INVENTION

1. Field of the Invention

The present invention relates vehicle frames and more particularly to a method of assembling vehicle frames with standardized spacing of the support holes through the vehicle frame siderails.

2. Description of the Prior Art

Trucks are built on frames which serve as foundations for the vehicle's body and as places to which various components may be attached. A typical full perimeter frame includes, among other components, two longitudinally extending frame siderails. The siderails are commonly connected to one another by several latitudinal cross members. The cross members connect the two siderails and provide lateral and torsional rigidity to the frame assembly. One cross member will typically be positioned to support a truck cab. In addition to cross members, the frame siderails will also provide points of attachment for a vehicle suspension components, fuel tanks, the muffler, air tanks, and potentially accessories of an end user's or a coach builder's choice.

Components and cross members are typically connected to the vehicle frame siderails by drilling holes from side to side through the cross members to provide support points. Components may then be brought positioned against the and mounting elements, such as bolts, nuts and brackets, may then be used to mount the components to the rail. Typically, the support holes have been positioned to fit the mounting hardware and dimensions of the component being mounted.

Different vehicle chassis customers will often want to have standard components, such as fuel tanks, placed at different points on the vehicle. While the frame siderails may readily have holes drilled through them to support the attachment of various components at different positions, conflicts in the positioning of support holes may arise when several different components are added or repositioned.

It has been recognized that manufacturing of the vehicles can be eased by standardizing support hole position. Daimler-Chrysler AG of Stuttgart, Germany produces the Mercedes-Benz Atego vehicle, which is equipped with a two section frame. The frame on these medium duty trucks is split into front and rear sections, with the front section siderails having a Z-cross section and the rear section siderails having a U or C shaped cross section. Front and rear siderails are bolted together behind the front suspension. The siderails of the rear frame section are supplied with two rows of support holes, which extend substantially the length of the rear section siderails, except in the area of the rear wheel suspension. The longitudinal spacing of the support holes is fixed at 50 mm. Pairs of holes are vertically aligned between the rows. This arrangement, while convenient for a vehicle intended to mount manufacturer specified components, has limitations in accommodating some end user specifications which can include numerous legacy components. Except for the aforementioned exceptions, there are no gaps in the rows. The spacing between the holes appears to be dictated by the standard increments for changing wheel base lengths on trucks, and Daimler in fact highlights ease of changing the wheelbase in promoting the Atego vehicle.

SUMMARY OF THE INVENTION

The invention relates to a motor vehicle frame. The frame is constructed from two parallel siderails running longitudinally down the length of the vehicle. The siderails are spaced by a plurality of cross members including an intermediate cross member support positioned to support a driver's cab. A datum support hole is positioned through each siderail to support mounting of one end of the cross member support for the driver's cab. The remaining support holes are arrayed in rows and columns positioned with reference to the datum support hole. A first row of supplemental support holes runs parallel to a bottom flange on each siderail and includes the datum support hole. A second row of supplemental support holes in each siderail runs parallel to and above the first row. A third row of supplemental support holes in each siderail runs parallel first and second rows and is positioned above the second row by the distance as the second row is above the first row. The supplemental support points in each siderail are longitudinally displaced from the datum support point by an integer multiple of a first fixed displacement in columns, one of which columns includes the datum support hole.

Standardization of the spacing of the positions for support holes will ease quality assurance in determining correct support hole position. It will also reduce engineering and manufacturing time for producing a customized vehicle due to the inherent lack of conflict in positioning support holes for different components.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
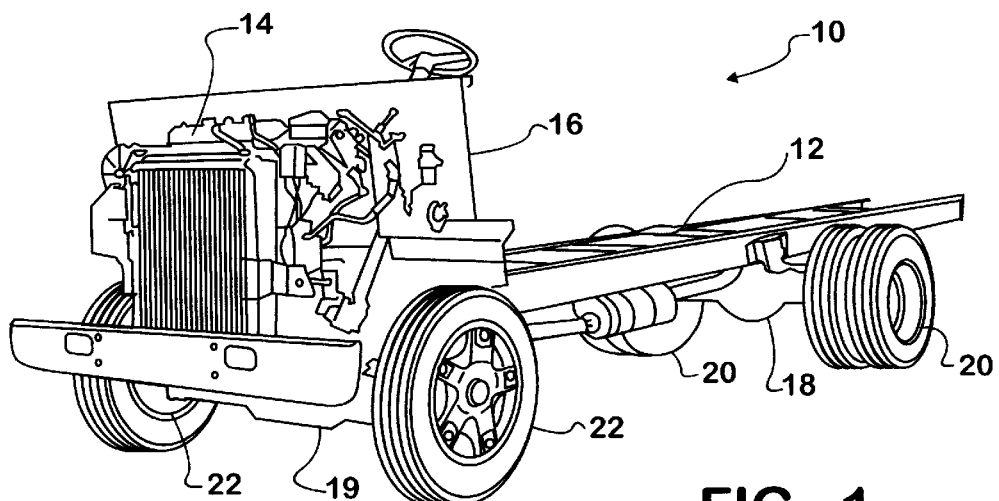
FIG. 1 is a perspective view of a vehicle chassis.

Referring now to FIG. 1 a vehicle chassis 10 is illustrated. The foundational component of chassis 10 is a box frame 12. Frame 12 provides connection points for suspension elements which position rear axle 18 and front axle 19. Rear wheels 20 and front wheels 22, are mounted on axles 18 and 19, respectively. Frame 12 carries an engine 14 and firewall 16 and provides a base for the construction of a body (not shown) and a place to hang numerous components (discussed below).

Figure 2:
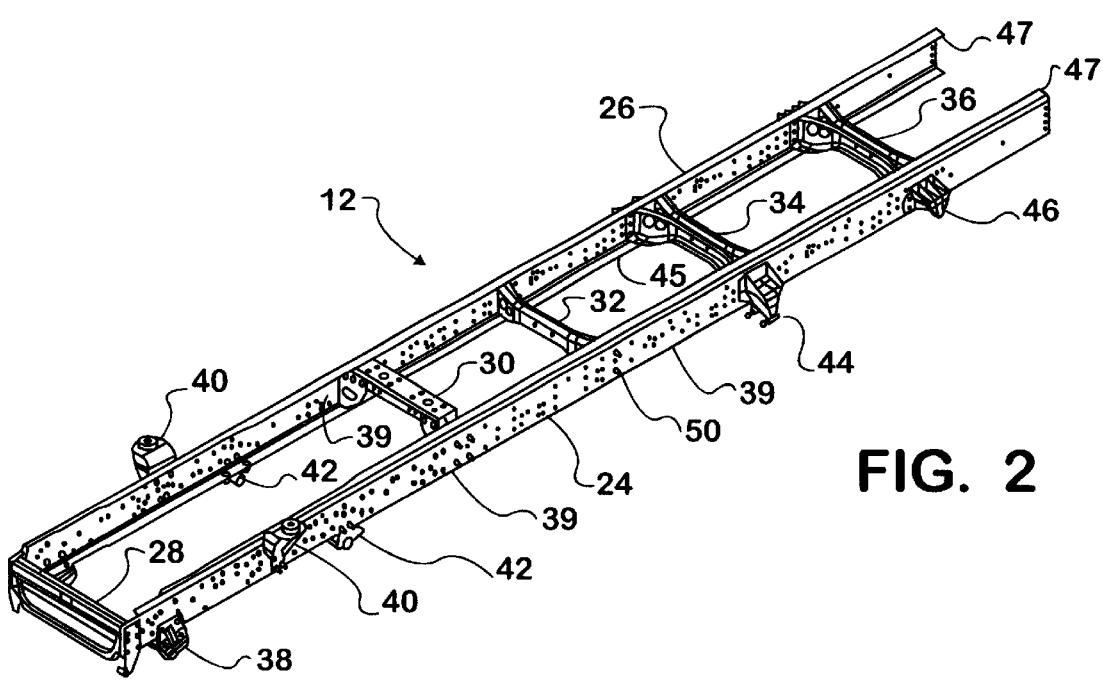
FIG. 2 is a perspective view of a truck frame incorporating the present invention.

Referring now to FIG. 2, box frame 12 is constructed from two elongated siderails 24 and 26, each of which run substantially the length of a vehicle, and which lie parallel to one another. Siderails 24 and 26 are held parallel to one another by a series of cross members, here arranged perpendicularly to the siderails, although other orientations for cross members are possible. The cross members include a forward cross member 28 positioned across the extreme forward ends of siderails 24 and 26. Next back from the front of frame 12 is an intermediately positioned, cab support cross member 30. The cab support cross member 30 supports a driver and passenger cab positioned on frame 12. The position of cross member 30 depends upon the size of the cab used, as illustrated below. In turn, the position of the cross member 30 determines the datum point used as a reference in drilling support holes through frame siderails 24 and 26. Moving further toward the back of frame 12, is an intermediate cross member 32, followed further back by two heavy duty dog bone cross members 34 and 36, positioned to reinforce the frame adjacent the suspension attachment points for the rear drive wheels 20.

Siderails 24 and 26 have top and bottom flanges 47 and 45, respectively (visible on siderail 26). Flanges 47 and 45 of both siderails 24 and 26 extend inwardly toward the center line of the frame 12, which the flanges from siderail 26 illustrate. Flanges 45 and 47 give the siderails 24 and 26 their characteristic C or U cross sectional shape. A few vehicle components are illustrated positioned on siderails 24 and 26, particularly mounting hardware for the vehicle suspension. These include forward hanger brackets 38, a upper retainer 40 for a forward shock absorber (not shown), the second set of forward suspension hanger brackets 42 and mounting hardware 44 and 46 for the rear wheel suspension. Numerous holes 39 are illustrated in siderails 24 and 26 which pass through the siderails to provides support points for the insertion mounting components including bolts and nuts. Nut and bolt combinations 50 are illustrated in association with cross members 30 and 32, providing connection of mounting hardware for the cross members to the frame 12.

Figure 3:
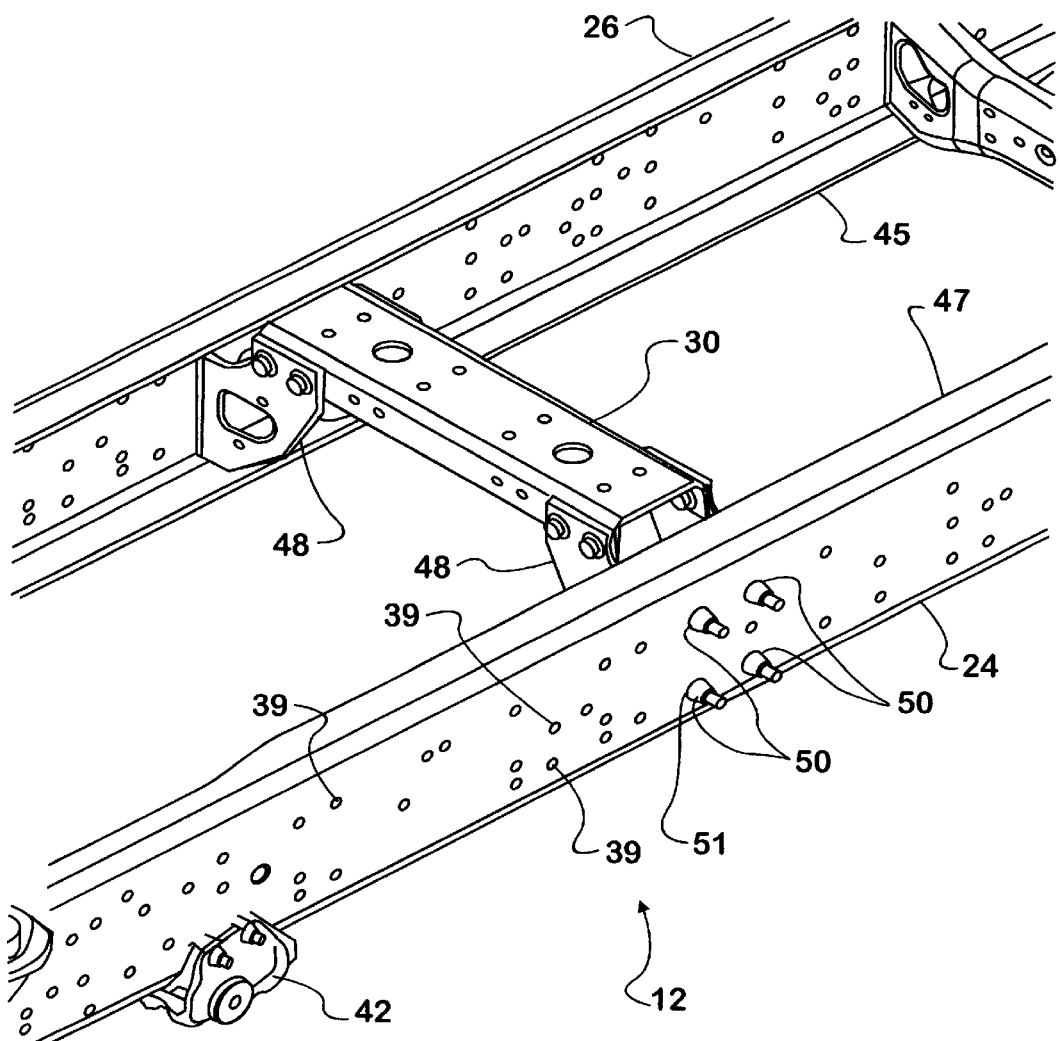
FIG. 3 is a detail view of a section of the truck frame of FIG. 2.

FIG. 3 illustrates a section of box frame 12 to better show the positioning and arrangement of support holes 39. The preferred pattern of support holes 39 is not carried forward through the area of hanger bracket 42, associated with the front suspension (not shown). Support holes 39 are preferably positioned in one of three rows of support holes running along siderails 24 and 26 between the attachment points for the forward and rear suspensions. The rows are vertically spaced from one another and are arranged in parallel. As illustrated, the cab support cross member 30 is attached by mounting hardware brackets 48 to the siderails by nut and bolt sets 50 positioned through selected support holes 39. One of the support holes 39 in the bottom row used for attaching the support member 30 is identified as a datum point 51 and becomes the reference for the positioning of the remaining, supplementary support holes 39.

Figure 4:
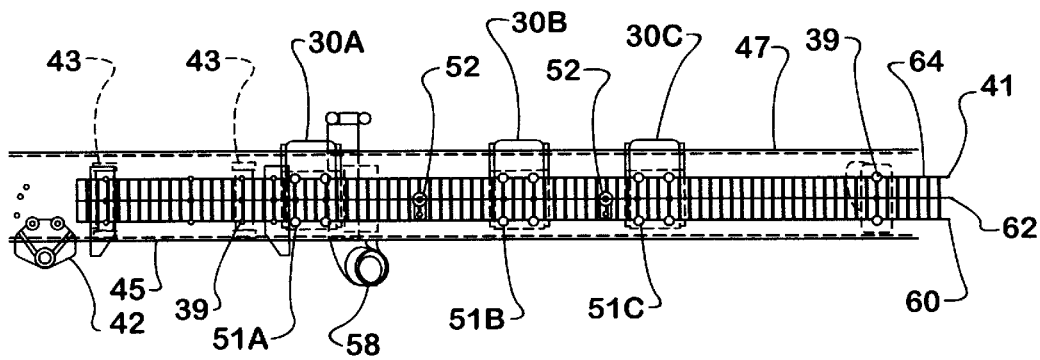
FIG. 4 is a side elevation of a frame siderail illustrating a pattern projecting possible locations for support holes drilled through the siderail.
Figure 5:
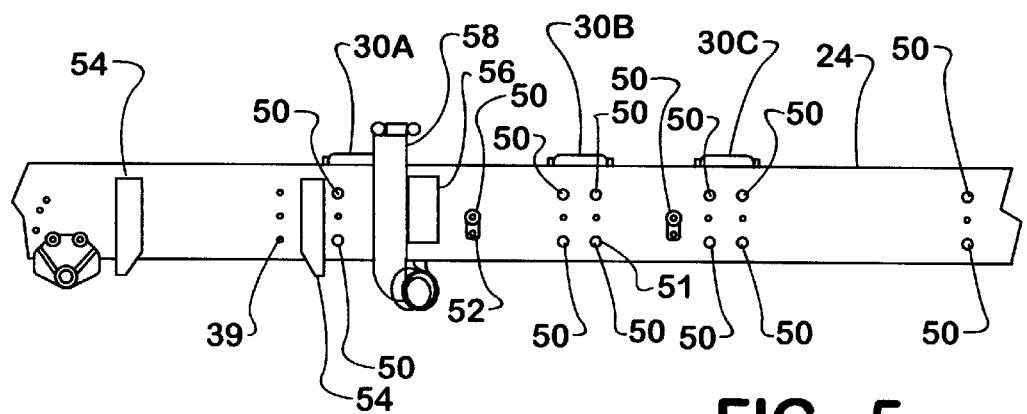
FIG. 5 is a side elevation of a frame siderail illustrating the positioning of support holes in accordance with the pattern of FIG. 4.

FIGS. 4 and 5 illustrate a method for reproducing desired patterns of support holes 39 on a siderail such as siderail 24, which is illustrated. Siderail 24, as described above, has a conventional U or C shaped cross-sectional profile, characterized by a vertically upright central body and two horizontal flanges 45 and 47 (shown in shadow). Between the aft front suspension hanger 42 and the forward most aft or rear suspension hanger (mounting hardware 44) support holes 39 are positioned only at points in a grid pattern 41. It is important to note that grid 41 is an engineering concept only and is not represented by any physical modification to siderail 26, except in so far as support holes are drilled into the siderail at grid and a topmost row 64 with the datum 51 in the bottommost row. The rows are preferably spaced in 61 mm increments. A large plurality of columns complete grid 41, with each column being spaced from its adjacent columns by 32 mm. Accordingly, any support hole 39 is vertically spaced from the datum 51 by 0, 61 or 122 mm. Support holes 39 are horizontally spaced from datum 51 by any whole number inter multiple or 32 mm, e.g., 0 mm, 96 mm 128 mm.

Holes 39 are drilled through the main central body of siderail 26 perpendicular to the principal direction of elongation of the siderail and parallel to the plane of flanges 45 and 47. The positioning of holes 39 is defined by the grid 41 which is conceptually positioned in reference to one of a plurality of datum points 51A, 51B, or 51C. The location of datum points 51A–C is fixed by the location of a cab support cross member 30A–C. Only one of cross members 30A–C will be installed on a given vehicle, the different cross members being mounted depending upon the type of cab to be installed on the completed vehicle, i.e. a standard cab, an extended cab, or a travel crew cab. Hence there is only one datum point per siderail on a given vehicle. The datum point will be selected to be one of the lower support points for the cross member on siderail 26, spaced from the top of the bottom flange 45 by a predetermined distance. The remaining holes 39 as required for various components to be attached to the frame will be drilled at points on the grid 41 stretching toward the front and back of the vehicle along siderail 26 and upwardly on the siderail.

Holes 39 are drilled at points to provide mounting support members for a vertical tail pipe section 58, battery support brackets 54, fuel tank brackets 43, the various intermediate cross members including one of cab support cross members 30A–C, and muffler hanger brackets 52. In some cases some or all of a set of holes used for one component, for example the holes 39 used to support one end of cross member 30A are also used to support the bracket 56 for the tail pipe 58. Similarly, the forward fuel tank bracket 43 shares support holes and nut and bolt sets 50 with the forward battery bracket 54. Components may be readily moved simply by displacing the set of support holes to be drilled. Coincidence of the holes with those for another component mounted on the opposite side of the siderail becomes an opportunity to use nut and bolt combinations 50 for two applications.

Standardization of the spacing between positions of support holes eases the burden on engineering and manufacturing time in producing a customized vehicle. Quality assurance in determining correct support hole position is also easier. The present invention results in an inherent lack of conflict in positioning support holes for different components.

While the invention is shown in only one of its forms, it is not thus limited but is susceptible to various changes and modifications without departing from the spirit and scope of the invention.

What is claimed is:

1. A method of manufacturing a motor vehicle frame having front and aft suspension attachment points, comprising the steps of:

providing two siderails having top and bottom flanges;

selecting an area on each side rail for attachment of a cab cross member support;

defining a datum on each siderail vertically displaced from the bottom flange of the each siderail and longitudinally positioned along each siderail within the selected area for attachment of the cab cross member support;

providing a cab cross member support hole through each siderail at the respective datums; and providing additional support holes through the siderails located in three parallel, vertically spaced rows, one of which rows includes the datum and the rows are vertically spaced from the row including the datum by whole number multiples of a vertical distance and extend from near a front suspension attachment point rearwards along each siderail to near the aft suspension attachment point, and where each of the support holes is further located in one of a plurality of columns which are parallel to and longitudinally spaced from a column containing the datum by whole number multiples of a predetermined distance.

2. An elongated siderail in a vehicle frame assembly including two elongated siderails running parallel to one another and a plurality of cross members mounted between the elongated siderails with an intermediate cross member for supporting a vehicle cab and attachment points for rear and front suspension elements, the vehicle frame assembly comprising:

a datum support hole running through the elongated siderail in a direction perpendicular to the direction of elongation and substantially parallel to a plane of the vehicle frame assembly, the datum support holes being located a fixed distance above a bottom feature of the elongated siderail and longitudinally placed in the siderail at a position corresponding to a position for mounting an end of the intermediate cross member for supporting the vehicle cab; and a plurality of supplemental support holes through the elongated siderail and parallel to the datum support hole, the supplemental support holes being spaced longitudinally from the datum support hole at fixed whole number multiples of a base longitudinal distance and vertically spaced from the datum support hole at fixed whole number multiples of a base vertical distance and located in rows between the attachment points for the front suspension element to the rear suspension element.

3. An elongated siderail as claimed in claim 2, wherein the datum support hole and supplemental support holes are arrayed in three rows running longitudinally along the siderail.

4. An elongated siderail as claimed in claim 3, wherein the base vertical distance is approximately 61 mm and the base longitudinal distance is approximately 32 mm.

5. A vehicle frame comprising:

two siderails in parallel;

a cross member support mounted between the two siderails and positioned to support a cab;

front and rear attachment points on each siderail for front and rear suspension elements, respectively;

a datum support point on each siderail positioned to support mounting of one end of the cross member support;

a first row of supplemental support points in each siderail running parallel to a bottom of each siderail and extending between the front attachment point to the rear attachment point;

a second row of supplemental support points in each siderail running parallel to the first row and vertically spaced therefrom and extending between the front attachment point to the rear attachment point;

a third row of supplemental support points in each siderail parallel to the first and second rows and vertically spaced from the first and second rows and extending between the front attachment point to the rear attachment point; and the supplemental support points in each siderail being longitudinally displaced from the datum support point by integer multiples of a first fixed displacement.

6. A vehicle frame as claimed in claim 5, and further comprising:

a bottom flange to each siderail;

the first row of supplemental support points being spaced a predetermined distance above the bottom flange;

the second row of supplemental support points being above the first row; and the third row of supplemental support points being above the first and second rows and spaced from the second row at the same distance that the second row is spaced from the first row.

7. A vehicle frame as claimed in claim 6, and further comprising holes through the siderails at the datum and supplemental support points to receive mounting hardware.

8. A vehicle frame as claimed in claim 7, wherein the first fixed displacement is approximately 32 mm and the spacing between the first and second rows, and the second and third rows is 61 mm.

* * * * *